Patented Jan. 13, 1953

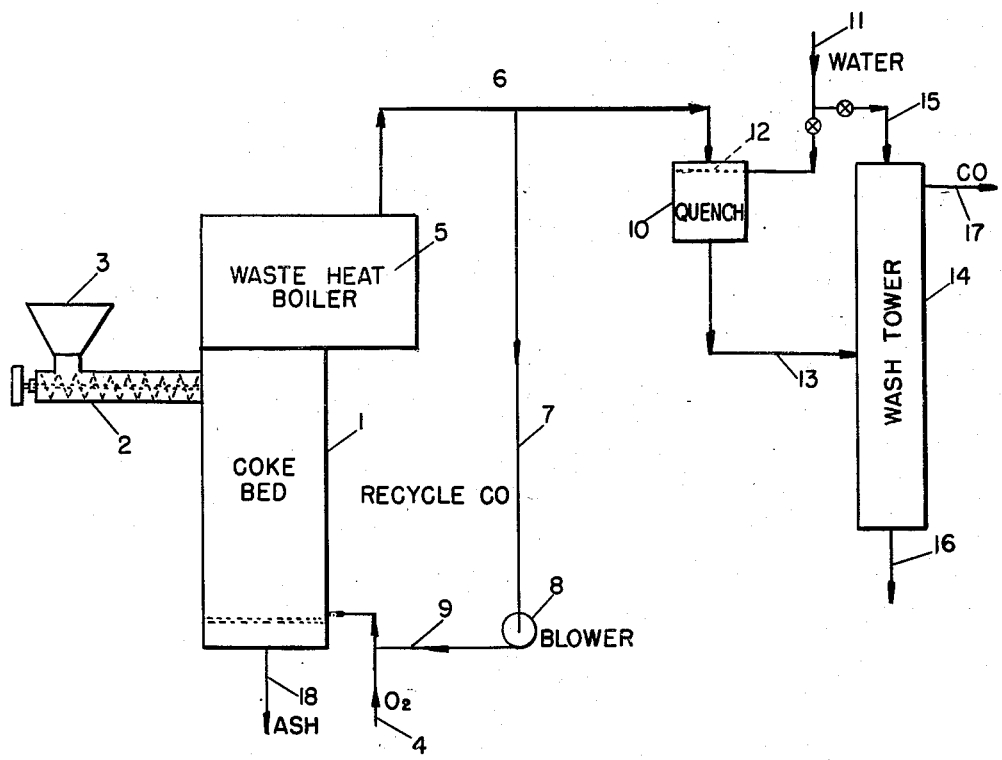

2,625,465

UNITED STATES PATENT OFFICE 2,625,465

GAS GENERATION

Thorpe Dresser, Whiting, and Reading B. Smith, Hammond, Ind., assignors to Sinclair Refining Company, New York, N. Y., a corporation of Maine Application October 23, 1947, Serial No. 781,742

4 Claims. (Cl. 23—204)

This invention relates to the production of carbon monoxide and provides an improved process adapted to the continuous manufacture of carbon monoxide gas of high purity by the continuous method of operation.

It has previously been proposed to manufacture carbon monoxide gas of high purity by passing substantially pure oxygen through a bed of hot coke, so as to avoid dilution of the resultant CO gas by atmospheric nitrogen. Such an operation is impractical because of the resultant excessive high temperatures in the reaction zone. It has also been proposed in operations involving the passage of oxygen in high concentration through a gas producer to avoid excessively high temperatures by mixing steam with the oxygen. This latter procedure is unsatisfactory where a carbon monoxide gas of high purity is required for the reason that hydrogen gas is produced by reaction of the steam with the hot carbon.

In accordance with our present process, substantially pure carbon monoxide gas may be produced while avoiding excessive temperatures in the reaction zone, by mixing a relatively large proportion of cooled carbon monoxide gas with substantially pure oxygen passed through the bed of hot carbonaceous material. The carbon monoxide gas used for this purpose is, with advantage, withdrawn from the stream of carbon monoxide gas passing from the coke bed, after the stream has been cooled by passing through a heat recovery system, such as, a waste heat boiler, to a temperature for instance materially below that of the reaction zone and below the temperature where conversion of the carbon monoxide to carbon dioxide and carbon would occur.

The proportion of carbon monoxide thus recycled through the system will depend upon the temperature permissible in the reaction zone and the temperature to which the carbon monoxide has been cooled prior to recycling. Usually, the rate at which the carbon monoxide is recycled will materially exceed the rate at which the carbon monoxide is generated and, also, will exceed the rate at which the oxygen is passed to the system. Thus, a large volume of carbon monoxide is continuously circulated through the coke bed where it absorbs heat and carries it out of the reaction zone to a heat recovery system where it can be advantageously utilized at the same time preventing excessive temperatures in the reaction chamber.

The proportion of carbon monoxide thus recycled through the system, as previously noted, will depend upon other operating conditions. Usually, permissible reaction zone temperatures, say, below 1,300° C., are attained where 200% to 300% of CO gas is recycled, based on the rate of CO generation.

The recycling of carbon monoxide in accordance with our present invention has the beneficial result of stabilizing and controlling the temperatures within the reaction zone while permitting the recovery and utilization of the maximum amount of available heat generated by the reaction. Further, the customary preheating of the gases fed to the reaction zone is unnecessary and usually undesirable.

It appears that the oxygen and recycled carbon monoxide mixture entering the reaction zone is ignited by the hot coke bed just above the grate, the oxygen uniting with part of the carbon monoxide to liberate heat, thus heating the gas stream and surrounding coke bed to a temperature from 1,000° to 1,300° C. At this temperature, in the presence of excess coke, the carbon dioxide so produced will be reduced to carbon monoxide with absorption of heat of a lesser amount than the heat produced by the reaction of oxygen and carbon monoxide. The recycled excess carbon monoxide absorbs and carries away the heat resulting from the above reactions thus preventing excessive temperature rise.

As an example of the operation, 1,000 pounds of substantially pure carbon monoxide per day may be produced while maintaining a reaction zone temperature of about 1,300° C. from 429 pounds per day of carbon by blowing the coke bed with 571 pounds per day of oxygen and recycling carbon monoxide at a rate of 2,434 pounds per day, assuming no loss in heat or materials. In practical operation, more or less loss in heat is inevitable so that a lower recycle rate will normally be used. Where a lower bed temperature is required, the recycle rate of the carbon monoxide will be increased. The rate at which oxygen is fed to the operation will depend upon the net production of carbon monoxide required.

The foregoing theoretical yield is based on the charging of the carbon and the oxygen to the system at a temperature of 80° F. and the cooling of the carbon monoxide before recycling to a temperature of 500° F. yielding $1.813 \times 10^6$ B. t. u. heat recovery per day.

The process will be further described and illustrated with reference to the accompanying drawing which represents conventionally and diagrammatically a flow sheet of a process embodying our invention.

In the drawing, the apparatus indicated by the reference numeral 1 represents a retort or gas producer of conventional design, for instance, suitably lined to withstand the high operating temperatures, and in which there is maintained a bed of coke, or other carbonaceous material, say, 8 to 10 feet in depth, the coke bed being supported by conventional means not shown in detail in the drawing.

The coke is fed into the retort continuously, or as required, by means of screw conveyor 2 from the coke bin 3. Oxygen gas advantageously substantially pure, but which may be diluted somewhat by the presence of other gases, is charged through line 4 into the lower end of the coke bed in the retort and passes upwardly through the coke. Some of the oxygen may react with the coke to form carbon monoxide to liberate large amounts of heat. However, a portion of the oxygen may react with the recycled carbon monoxide entering the oxygen stream by way of line 9 as described below. Regardless of the amount of oxygen that reacts with the recycled carbon monoxide and the amount that reacts with the coke bed, the overall effect will be a generation of considerable amounts of heat that are carried from the reaction zone by an excess of recycled carbon monoxide. Effluent carbon monoxide gas passes from the upper end of the retort through a waste heat boiler, or other heat recovery system, diagrammatically represented at 5, adapted to cool the gases to a temperature of about 500° F.

The cooled carbon monoxide gas passes from the heat recovery system through line 6 and a portion thereof is drawn through line 7 by blower 8 and passed through line 9 into line 4 where it is admixed with the oxygen and passes therewith into the retort 1 and up through the body of coke therein.

The remainder of the effluent carbon monoxide gas passes into the quench chamber 10 where it is further cooled by spraying with water passing to the chamber through line 11 and spray header 12. The cooled gases passed together with the spray water through line 13 into the wash tower 14, which may be of conventional design, wherein the gas is washed with further water introduced through line 15 and which passes downwardly through the tower in contact with the rising gases removing fly ash and the like from the gases.

The wash water passes from the tower through line 16 and the washed carbon monoxide gas passes off through line 17 to storage or directly to the place of use. Any objectionable sulfur compounds present in the gas may be removed therefrom, as by known methods, prior to the use of the gas.

As previously noted, the bed of coke may be supported in the retort in conventional manner, as by means of a grate, or the like, and the ash accumulating in the lower part of the retort is withdrawn through line 18.

We claim:

1. In a process for the generation of substantially pure carbon monoxide, the improvement which comprises the steps of continuously introducing oxygen into a bed of hot carbonaceous material in a retort, continuously withdrawing carbon monoxide from the retort, cooling the effluent carbon monoxide and continuously recycling a portion of the cooled carbon monoxide to the bed of carbonaceous material in admixture with the oxygen at a rate substantially in excess of the rate of generation of the carbon monoxide.

2. A continuous process for the generation of carbon monoxide gas which comprises maintaining a bed of hot coke in a retort at temperatures from about 1,000° C. to about 1,300° C., continuously introducing oxygen, substantially undiluted except for carbon oxides, into the coke bed, continuously withdrawing carbon monoxide from the retort, cooling the effluent carbon monoxide and continuously recycling a portion of the cooled carbon monoxide to the bed of coke in admixture with the oxygen at a rate substantially in excess of the rate of generation of the carbon monoxide.

3. A continuous process for the generation of carbon monoxide gas which comprises maintaining a bed of hot coke in a retort, continuously introducing oxygen, substantially undiluted except for carbon oxides, into the coke bed, continuously withdrawing carbon monoxide from the retort, cooling the effluent carbon monoxide and continuously recycling a portion of the cooled carbon monoxide to the bed of coke in admixture with the oxygen at a rate 200% to 300% that at which the carbon monoxide is generated.

4. A continuous process for the generation of carbon monoxide gas which comprises maintaining a bed of hot coke in a retort at temperatures from about 1,000° C. to about 1,300° C., continuously introducing oxygen, substantially undiluted except for carbon oxides, into the coke bed, continuously withdrawing carbon monoxide from the retort, cooling the effluent carbon monoxide and continuously recycling a portion of the cooled carbon monoxide to the bed of coke in admixture with the oxygen at a rate 200% to 300% that at which the carbon monoxide is generated.

THORPE DRESSER.
READING B. SMITH.

REFERENCES CITED

The following references are of record in the file of this patent:

UNITED STATES PATENTS

| Number | Name | Date |
|---|---|---|
| 1,761,384 | Chase et al. | June 3, 1930 |

FOREIGN PATENTS

| Number | Country | Date |
|---|---|---|
| 326,227 | Great Britain | Mar. 3, 1930 |